united States Patent Office 2,810,756
Patented Oct. 22, 1957

2,810,756

MANUFACTURE OF ORGANIC PHOSPHORUS COMPOUND HAVING INSECTICIDAL PROPERTIES

Max Pianka, Wheathampstead, and Victor Horace Chambers, Luton, England, assignors to The Murphy Chemical Company Limited, St. Albans, England No Drawing. Application September 13, 1954, Serial No. 455,794

Claims priority, application Great Britain June 26, 1950

4 Claims. (Cl. 260—545)

This application is a continuation-in-part of our patent application Serial No. 232,876, filed June 21, 1951, now abandoned. In the present application the chemical nomenclature has been revised so that it is believed to conform to the latest internationally accepted nomenclature for organic phosphorus compounds.

It is known that octamethylpyrophosphoramide (known by its trivial name schradan, and, hereinafter referred to as schradan) of the formula:

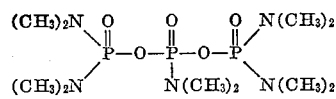

is an insecticidal compound.

In P. B. 95,312 it was stated that the above compound could be prepared by hydrolysing one molecular proportion of tetramethylphosphorodiamidic chloride with two molecular proportions of caustic soda to produce the corresponding sodium salt under carefully controlled conditions, which conditions were not described. The sodium salt was then said to be reacted in toluene on the water-bath with further tetramethylphosphorodiamidic chloride, or with the corresponding fluoride, to form octamethylpyrophosphoramide. These two steps of the process were represented as follows:

(1)

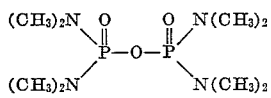

(2)

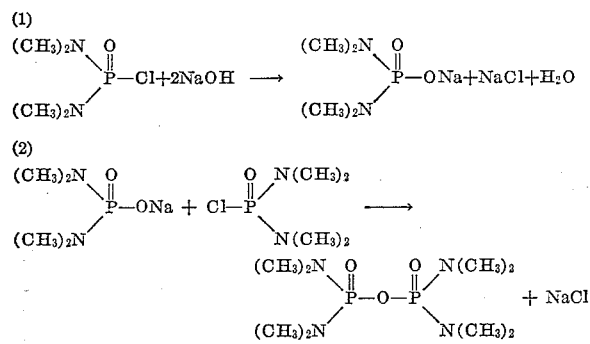

Dr. G. Schrader, who gave the information on which the statement above referred to was based, has since written a monograph in German dated 1951, and published in connection with "Angewandte Chemie" and "Chemie-Ingenieur-Technik" by Verlag Chemie of Weinheim, entitled "The Development of New Insecticides on the Basis of Organic Fluorine and Phosphorus Compounds," in which publication there is no mention of the reaction set forth above, although the compound concerned is referred to in detail and its synthesis described by another method.

A method of manufacture of the compound concerned is described in British specification No. 631,549, in which anhydrous dimethylamine is introduced into a solution of phosphorus oxychloride in an inert solvent until 4 mols. of the amine have been introduced per mol. of phosphorus oxychloride, dimethylamine hydrochloride is removed, and the residue containing tetramethylphosphorodiamidic chloride is reacted with water and pyridine. British specification No. 652,981 describes a development of the above method.

According to the patentees of British Patent No. 631,549 (Hartley et al., Journal of the Science of Food and Agriculture, 1951, 2,305) the product of B. P. 631,549 consists of approximately equal proportions of schradan and decamethyltriphosphoramide (which we shall subsequently refer to as DTP) of the following structure:

$$(CH_3)_2N \diagdown \underset{(CH_3)_2N}{\overset{O}{\underset{\parallel}{P}}} -O- \underset{N(CH_3)_2}{\overset{O}{\underset{\parallel}{P}}} -O- \underset{N(CH_3)_2}{\overset{O}{\underset{\parallel}{P}}} \diagup N(CH_3)_2$$

The formation of decamethyltriphosphoramide in the preparation of schradan is undesirable, since, though generally possessing comparable systemic insecticidal activity (L. A. Lickerish, ibid., 1953, 4, 24), it requires more dimethylamine and phosphorus than schradan, and, is, therefore, less economical; it is, moreover, much less stable than schradan, its half-life in saturated lime-water at 25° C. being about 40 hours, while that of schradan under the same conditions is about 8 years (Hartley et al., ibid., 1951, 2, 306).

An object of the present invention is to provide a more economical process for the manufacture of technical schradan, consisting of a condensation reaction using a single organic phosphorus compound and taking place in one chemical stage from tetramethylphosphorodiamidic chloride with the production of a technical material with a very high proportion of schradan and a low proportion of other phosphoramides.

A further object of the invention is to produce a product containing a low proportion of DTP.

The present invention provides a process for the manufacture of technical octamethylpyrophosphoramide consisting in condensing two molecular proportions of tetramethylphosphorodiamidic chloride, in the presence, as condensing agent, of about two molecular proportions of a compound of the group consisting of sodium and potassium hydroxides, by heating until an organic liquid phase free from dissolved tetramethylphosphorodiamidic chloride is produced and, if desired, isolating the phosphoramide product. It is known that in the manufacture of insecticides it is not always necessary to incur the additional expense of isolating the pure insecticidal compound. Advantageous results are obtained by the use of a slight excess of over two molecular proportions of the condensing agent. It is also advantageous to carry out the condensation in a vessel constructed of a material of good heat transfer properties such as mild steel, in order to avoid local overheating which is detrimental to the production of the best yields.

In general vigorous reaction conditions should be avoided and it is of advantage for this purpose to use an inert organic solvent, particularly when potassium hydroxide is used as condensing agent. This solvent is advantageously water-immiscible, such as toluene, which acts as a water-entraining agent so that water formed can be continuously removed by azeotropic distillation during the reaction, for example, by the known Dean and Stark method used in testing petroleum oils. As is known, it is not necessary for this purpose that the solvent should boil at above 100° C., although reaction temperatures of 100–150° C. have proved to be suitable in the present case. Excess solvent is subsequently removed by distillation.

However the solvent can be water-miscible, such as dioxane, in which case water and solvent may be removed when the reaction is complete, although this is not always necessary for subsequent insecticidal use of the product.

When sodium hydroxide, for example, is used without a solvent, the reaction is best carried out at a temperature of 80–90° C. while applying reduced pressure to the system in order to eliminate water formed during the reaction.

In the case of the use of potassium hydroxide as condensing agent, the reaction may be represented as follows:

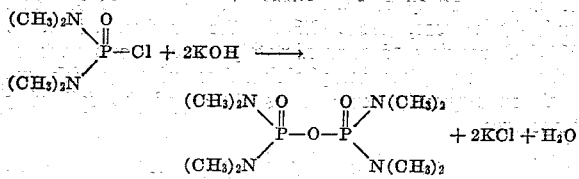

The tetramethylphosphorodiamidic chloride used as starting material may be prepared by a method in itself known. Thus it may be obtained by reacting anhydrous dimethylamine with phosphorus oxychloride in an organic solvent.

In many cases it is not necessary to isolate the tetramethylphosphorodiamidic chloride before causing it to react with the alkali metal hydroxide, so that the reaction mixture containing the diamidic chloride may be reacted directly with the alkali metal hydroxide.

The following examples illustrate the invention, the parts being by weight, unless otherwise stated, and the relationship of parts by weight to parts by volume being the same as that of the kilogram to the litre:

*Example 1*

A solution of 201 parts of anhydrous dimethylamine in 400 parts of toluene was added during 7 hours to a stirred solution of 170 parts of phosphorus oxychloride in 540 parts of toluene, maintaining the temperature of the reaction mixture between 25° C. and 30° C.

The reaction mixture was subsequently stirred during 30 minutes to complete the reaction; it was then filtered from the precipitated dimethylamine hydrochloride and the solid washed with about 150–200 parts of toluene.

By analysis it was found to represent a 90% yield of tetramethylphosphorodiamidic chloride. There were approximately 1,700 parts of a 10% w./w. solution of the diamidic chloride in toluene.

In order to provide mild conditions of reaction which lead to a high proportion of schradan in the technical material the diamidic chloride solution was added in 3 portions to a mixture of toluene and finely powdered potassium hydroxide. Analysis after each addition showed that, in spite of the large excess of the alkali metal hydroxide present, condensation to the phosphoramide took place.

The following is the procedure in detail:

400 parts of toluene and 76 parts of finely powdered potassium hydroxide were placed in a jacketed mild steel vessel fitted with a condenser, water-separator and an efficient stirrer.

To the stirred mixture, 400 parts of the above toluene solution of tetramethylphosphorodiamidic chloride were added, the temperature raised to gentle reflux, and cooled to 90° C., a second portion of 650 parts of the above solution was added, the temperature raised to gentle reflux, cooled to 90° C., and then the remainder of the solution was added. The mixture was then refluxed for 2½–3 hours while maintaining the jacket temperature at about 120–125° C. and eliminating the water formed during the reaction through the water separator; at the end of this period the toluene solution contained no dissolved chloride.

After cooling, the toluene solution was filtered to remove a solid consisting principally of potassium chloride; the solid was washed well with toluene, and the toluene was distilled from the combined filtrate and washings under reduced pressure, leaving 135 parts of residual oil: (expected weight: 158 parts), having the following composition:

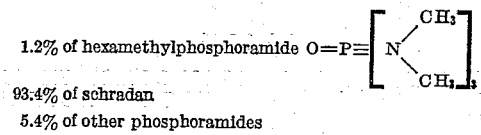

1.2% of hexamethylphosphoramide
93.4% of schradan
5.4% of other phosphoramides

This represents an overall yield of 79.8% of schradan, based on the starting materials phosphorus oxychloride and dimethylamine or an 88.5% yield as based upon tetramethylphosphorodiamidic chloride.

The product had a high stability. No change in composition was observed on storing it for two months at 50° C.

*Example 2*

34.1 parts of tetramethylphosphorodiamidic chloride were added to a stirred mixture of 12.2 parts of finely powdered potassium hydroxide (98% pure) in 113 parts by volume of toluene, contained in a mild steel vessel fitted with a water separating apparatus, whereby the water was removed from the condensed toluene before the latter was returned to the reaction vessel. The mixture was heated in a bath while stirring; a vigorous reaction set in at a temperature of 85° C. The mixture was heated, while stirring, for a further 4 hours in a bath having a temperature of 120–125° C. After this time the toluene solution contained no dissolved chloride.

2.9 parts of water were collected by the water separator. The mixture was worked up as in Example 1, leaving 26.9 parts of residual oil (expected weight 28.6 parts) whose composition was as follows:

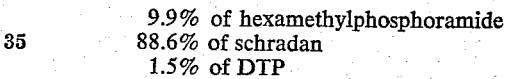

9.9% of hexamethylphosphoramide
88.6% of schradan
1.5% of DTP

This represents an overall yield of 83.3% of schradan.

*Example 3*

The same procedure was used as in Example 2 except that 10.2 parts of finely powdered sodium hydroxide were used. No vigorous reaction occurred on heating. No chloride remained in solution. The reaction mixture was worked up as before, leaving 25.1 parts of residual oil (expected weight 28.6 parts), whose composition was as follows:

3.2% of hexamethylphosphoramide
94.7% of schradan
2.8% of DTP

This represents an overall yield of 83.1% of schradan.

*Example 4*

A solution of 34.1 parts of tetramethylphosphorodiamidic chloride in 50 parts by volume of dioxane was added, during ½ hour, to a well-stirred and gently refluxing mixture of 15.2 parts of finely ground potassium hydroxide (98% pure) in 70 parts by volume of dioxane.

After 5 hours' refluxing and stirring there was no organic chloride in solution. The cooled mixture was filtered from a solid consisting principally of potassium chloride. The dioxane and the water which formed during the reaction were distilled off under reduced pressure, leaving 26.4 parts of a straw-coloured oil (expected weight 28.6 parts); this had the following composition:

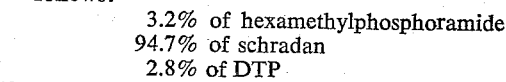

6% of hexamethylphosphoramide
77% schradan
4% DTP, and
13% other phosphoramides

An overall yield of 70% of schradan was obtained.

*Example 5*

34.1 parts of tetramethylphosphorodiamidic chloride were added, while stirring, during ½ hour, to 10.9 parts of finely powdered sodium hydroxide (98% pure), contained in a vessel heated to 80° C. (outside temperature), and connected to a vacuum pump maintaining a pressure of 40 mm. Hg. The reduced pressure was used in order to remove the water formed during the reaction. The reaction mixture was kept at 80–90° C. (outside temperature) for 6 hours, at the end of which a sample of the oil showed a negative chloride reaction. The reaction mixture was added to 150 parts by volume of water and extracted 4 times with 40 parts by volume of chloroform. The chloroform layer was separated and the chloroform distilled, leaving 27 parts of an oil (expected weight 28.6 parts) which had the following composition:

8% of hexamethylphosphoramide
73% of schradan
9% of DTP
10% of other phosphoramides This represents an overall yield of 69.0% of schradan.

We claim:

1. In the process for the manufacture of octamethyl pyrophosphoramide involving heating two molecular portions of tetramethyl phosphorodiamidic chloride, in the presence of an alkali metal hydroxide as condensing agent, to form octamethyl pyrophosphoramide and water as reaction products in a single step, the improvement that involves removing the water of reaction during the course of the condensation.

2. A process as claimed in claim 1, wherein the metal hydroxide condensing agent is potassium hydroxide.

3. A process as claimed in claim 1, wherein the metal hydroxide condensing agent is sodium hydroxide.

4. A process as claimed in claim 11, wherein the water of reaction is removed during the course of the condensation by azeotropic distillation.

References Cited in the file of this patent

UNITED STATES PATENTS

| 2,671,109 | Hartley et al. | Mar. 2, 1954 |
| 2,706,738 | Toy et al. | Apr. 19, 1955 |

FOREIGN PATENTS

| 631,549 | Great Britain | Nov. 4, 1949 |

OTHER REFERENCES

P. B. 95312 (BIOS Report 1808), Dec. 1947, pages 16 and 17.